United States Patent
Nakazaki

[11] Patent Number: 5,831,343
[45] Date of Patent: Nov. 3, 1998

[54] DEAD WEIGHT DISPLAY APPARATUS

[75] Inventor: Yoji Nakazaki, Shizuoka, Japan

[73] Assignee: Yazaki Corporation, Tokyo, Japan

[21] Appl. No.: 887,893

[22] Filed: Jul. 3, 1997

[30] Foreign Application Priority Data

Jul. 5, 1996 [JP] Japan .................................. 8-176691

[51] Int. Cl.$^6$ .................................................. G01G 19/08
[52] U.S. Cl. ........................ 307/10.1; 307/9.1; 177/136; 177/141; 180/290; 280/DIG. 1
[58] Field of Search ................... 177/136, 141; 307/9.1, 10.1, 10.6, 10.7, 10.8; 180/271, 290; 280/DIG. 1; 701/36; 340/613, 666; 364/479.1, 567, 568; 377/22

[56] References Cited

U.S. PATENT DOCUMENTS

| | | | |
|---|---|---|---|
| 3,863,209 | 1/1975 | Hollins | 307/10.1 |
| 4,042,049 | 8/1977 | Reichow et al. | 177/137 |
| 4,541,066 | 9/1985 | Lewandowski | 364/580 |
| 4,588,038 | 5/1986 | Takagi | 177/141 |
| 4,630,227 | 12/1986 | Hagenbuch | 177/136 |
| 4,662,491 | 5/1987 | Takefuta et al. | 192/0.032 |
| 4,766,580 | 8/1988 | Go et al. | 369/21 |
| 4,768,636 | 9/1988 | Ito et al. | 192/0.08 |
| 5,105,896 | 4/1992 | Kyrtsos | 177/139 |
| 5,391,843 | 2/1995 | Sato et al. | 177/141 |
| 5,410,477 | 4/1995 | Ishii et al. | 364/424.01 |
| 5,478,974 | 12/1995 | O'Dea | 177/136 |
| 5,629,715 | 5/1997 | Zenda | 345/3 |
| 5,706,909 | 1/1998 | Bevins et al. | 307/10.2 |

FOREIGN PATENT DOCUMENTS

| | | | |
|---|---|---|---|
| 62-31286 | 7/1987 | Japan | G01G 19/12 |
| 5-50054 | 2/1996 | Japan | G01G 19/08 |

*Primary Examiner*—Jeffrey A. Gaffin
*Assistant Examiner*—Peter Ganjian
*Attorney, Agent, or Firm*—Sughrue, Mion, Zinn, Macpeak & Seas, PLLC

[57] ABSTRACT

In accordance with an output signal from a weight sensor mounted on a vehicle, a display control section causes a display unit to display weight calculated at predetermined intervals by a weight calculating section. The display control section adds, to the weight which is being displayed, the difference in the weights sequentially calculated by the weight calculating section from detection of start of a loading/unloading operation performed by a detection section to start of running of the vehicle and causes the display unit to display the obtained weight. A power supply control section for controlling a power supply circuit for supplying operating electric power for the sensor, the display unit, the display control section and the detection section controls to interrupt supply of operating electric power from the power supply circuit when an ignition switch is switched off. Whenever a predetermined time is measured by a time measuring section, the power supply circuit is caused to supply operating electric power to at least the sensor, the display control section and the detection section.

5 Claims, 9 Drawing Sheets

| |  |
|---|---|
| HF FLAG | 3a |
| KF FLAG | 3b |
| BF FLAG | 3bb |
| SP FLAG | 3c |
| HKF FLAG | 3d |
| WEIGHT W1 CALCULATED THIS TIME | 3e |
| WEIGHT W2 CALCULATED PREVIOUSLY | 3f |
| DISPLAYED WEIGHT WD | 3g |
| REFERENCE WEIGHT WS | 3h |
| DEVIATION ΔW | 3i |

2 x n SECONDS

AVERAGE
WEIGHT OF
2 x n WEIGHTS

FIG. 13 (b)

2 SECONDS
WS

W1

DEAD WEIGHT DISPLAY APPARATUS

BACKGROUND OF THE INVENTION

1. Field of the Invention

The present invention relates to a dead weight display apparatus for displaying weight loaded on a vehicle, more particularly on a bed of a vehicle for carrying cargo so as to prevent an overload.

2. Description of the Related Art

A dead weight display apparatus of the foregoing type has been structured such that loads applied to the front and rear wheels of the vehicle are detected by sensors and weight is calculated in accordance with signals output from the sensors so as to issue an alarm if the dead weight becomes excessive. However, since loads applied to the sensors are changed during running of the vehicle, an accurate dead weight cannot be displayed. Accordingly, there has been suggested a structure capable of preventing the foregoing problem in Japanese Patent Unexamined Publication No. Hei. 8-50054.

The dead weight display apparatus suggested as described above has a structure such that the weight calculated by a weight calculating means in accordance with output signals from sensors is not displayed on a displaying means as it is during running of the vehicle. As an alternative to this, the weight detected before start of running by a predetermined time is displayed and display of this weight is retained until another predetermined time elapses after running has been stopped. That is, the weight detected before start of running by a predetermined time is displayed in a period from start of running of the vehicle to a moment at which a predetermined time has passed from stoppage of the vehicle. The weight detected after the vehicle has been stopped does not always coincide with the weight detected before start of running of the vehicle even if loading or unloading is not performed. Therefore, the difference between weights calculated sequentially is added to the weight displayed previously so as to update the display after the vehicle has been stopped.

In general, units arranged to be mounted on a vehicle are supplied with operating electric power from a battery. Therefore, if supply of electric power to the units is continued in a state where the engine has been stopped and thus generation of electric power is not performed, a problem arises in that the battery goes flat and the engine cannot be rotated. In order to minimize supply of electric power to the units to prevent the fact that the battery goes flat, supply of electric power to the units is generally interrupted in a state where the ignition switch has been switched off so as to interrupt the operations of the units.

If a loading/unloading operation is completed during a period in which the ignition switch is switched off to interrupt supply of electric power to the apparatus suggested as described above to stop the operation of the apparatus and then the ignition switch is again switched on, start of the loading/unloading operation cannot be detected after a predetermined time has elapsed from a moment at which the running vehicle has been brought to the stoppage state. Moreover, the weight enlarged or reduced attributable to the loading/unloading operation performed before the ignition switch is switched on cannot be calculated. Thus, display of the weight to which the weight enlarged or reduced attributable to the loading/unloading operation is reflected cannot be performed. What is worse, even if an overload state has been realized, a determination of the overload cannot be performed to issue an alarm.

SUMMARY OF THE INVENTION

In view of the foregoing, an object of the present invention is to provide a dead weight display apparatus improved to be capable of displaying accurate dead weight.

In order to achieve the above-mentioned object, the invention provides a dead weight display apparatus comprising: weight calculating means for calculating a weight at regular intervals in response to an output signal from a sensor attached to a vehicle; display means for displaying the weight; display control means for controlling the display means to display the weight calculated by the weight calculating means; detection means for detecting start of a loading/unloading operation; a power supply circuit for supplying operating electric power to the sensor, the display means, the display control means and the detection means; and power supply control means for controlling the power supply circuit, wherein the display control means adds difference between the weights sequentially calculated by the weight calculating means from detection of start of the loading/unloading operation performed by the detection means to start of running of the vehicle to the weight which is being displayed and causes the display means to display the added weight, and the power supply control means has time measuring means for repeatedly measuring time at regular intervals in a period in which an ignition switch is switched off and causes the power supply circuit to supply the operating electric power to at least the sensor, the display control means and the detection means whenever the time measuring means measures time at the regular intervals.

DETAILED DESCRIPTION OF THE PREFERRED EMBODIMENT

Figure 1:
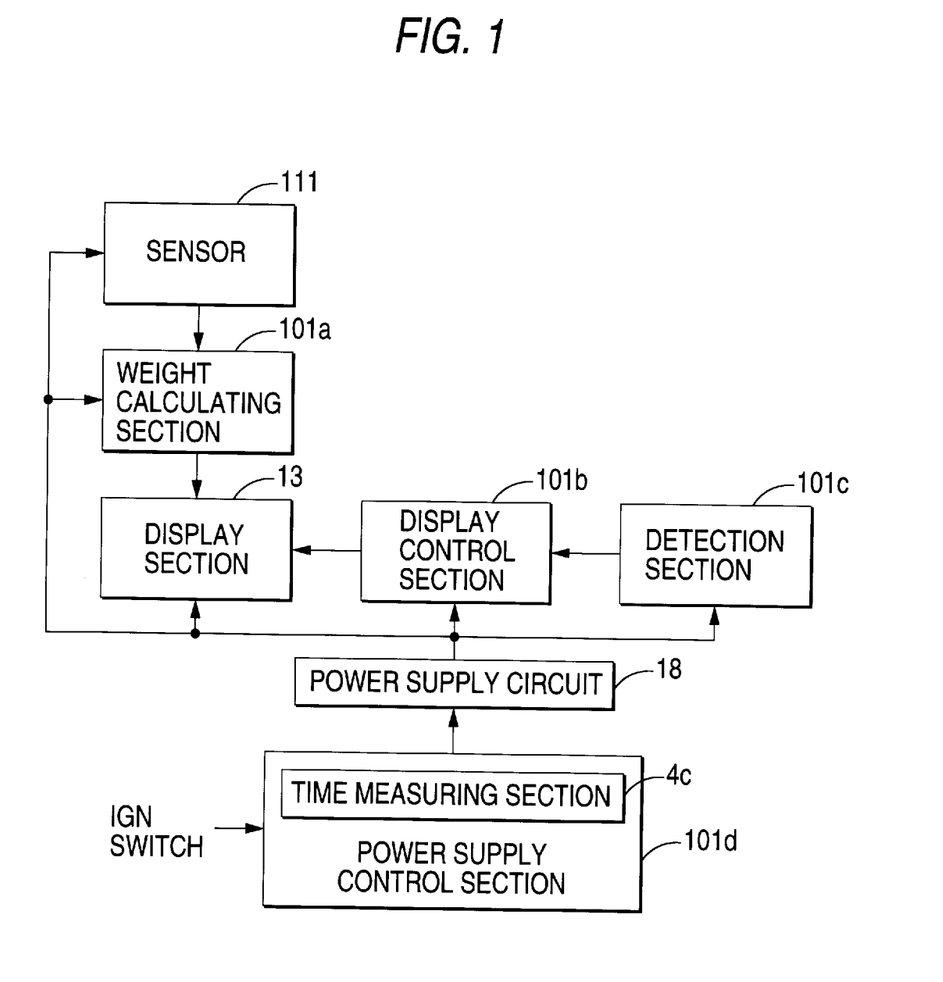
FIG. 1 is a basic structural view showing a dead weight display apparatus according to the present invention.

A dead weight display apparatus according to the present invention, as shown in a basic structural view shown in FIG. 1, comprises a weight calculating section 101a for calculating weight at regular intervals in response to output signals from a sensor 111 attached to a vehicle; a display section 13 for displaying the weight; a display control section 101b for controlling the display section to display the weight calculated by the weight calculating section; a detection section 101c for detecting start of a loading/unloading operation; a power supply circuit 18 for supplying operating electric power to the sensor, the display section, the display control section and the detection section; and a power supply control section 101d for controlling the power supply circuit. Further, the dead weight display apparatus is arranged such that the display control section adds difference between the weights sequentially calculated by the weight calculating section from detection of start of the loading/unloading operation performed by the detection section to start of running of the vehicle to the weight which is being displayed and causes the display section to display the added weight, and the power supply control section controls the power supply circuit not to supply the operating electric power when an ignition switch is switched off, wherein the power supply control section has a time measuring section 4c for repeatedly measuring time at regular intervals in a period in which the ignition switch is switched off and causes the power supply circuit to supply operating electric power to at least the sensor, the display control section and the detection section whenever the time measuring section measures time at the regular intervals.

In the above-mentioned structure, the display control section 101b performs control to cause the display section 13 to display the weights calculated at regular intervals by the weight calculating section 101a in accordance with output signals from the sensors 111 attached to the vehicle. The display control section adds difference between the weights sequentially calculated by the weight calculating section from detection of start of the loading/unloading operation performed by the detection section 101c to start of running of the vehicle to the weight which is being displayed. The power supply control section 101d controls the power supply circuit 18 for supplying operating electric power to the sensor, the display section, the display control section and the detection section not to supply the operating electric power from the power supply circuit when the ignition switch is switched off. Whenever the time measuring section 4c for repeatedly measuring time at regular intervals in a period in which the ignition switch is switched off measures time at the regular intervals, operating electric power is supplied from the power supply circuit to at least the sensors, the display control section and the detection section.

Since the power supply control section 101d, which interrupts supply of operating electric power to the sensors, the display section, the display control section and the detection section when the ignition switch is switched off, causes the power supply circuit to supply operating electric power to at least the sensors, the display control section and the detection section whenever the time measuring section 4c measures time at the regular intervals, electric power consumption can be minimized. Since the power supply control section 101d causes the power supply circuit to supply operating electric power to the sensors, the display control section and the detection section at regular intervals, the weight enlarged or reduced attributable to the loading/unloading operation can be detected in accordance with the difference in the weights sequentially calculated by the weight calculating section even if the ignition switch is switched off. When the ignition switch has been switched on, display of weight can be performed such that the weight enlarged or reduced attributable to the loading/unloading operation is reflected to the weight which is being displayed. Moreover, overload can be determined and an alarm can be issued.

Figure 2:
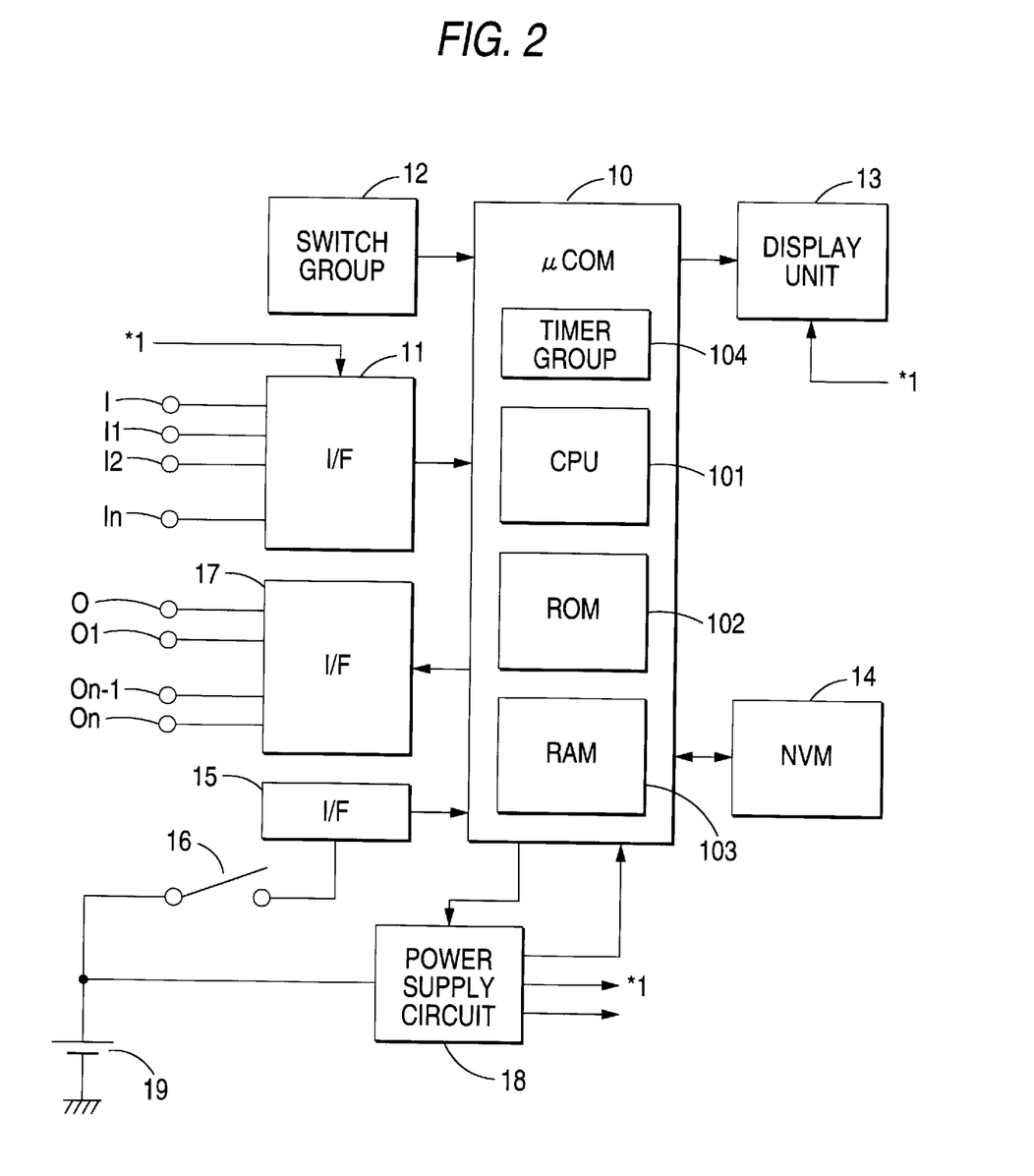
FIG. 2 is a block diagram showing an embodiment of the dead weight display apparatus according to the present invention.

An embodiment of the present invention will now be described with reference to FIGS. 2 to 5. FIG. 2 is a diagram showing an embodiment of a dead weight display apparatus according to the present invention. The dead weight display apparatus, as shown in FIG. 2, has a one-chip microcomputer ($\mu$COM) 10 arranged to be operated with electric power supplied from a power supply circuit which will be described later. A running-sensor signal input terminal I and load-sensor signal input terminals I1 to In are, through an interface (I/F) circuit 11, connected to the $\mu$COM 10. The running-sensor signal input terminal I is supplied with running pulses from a running sensor (not shown), while the load-sensor signal input terminals I1 to In are supplied with pulses having a frequency in proportion to voltage output from a weight sensor which will be described later.

Figure 3:
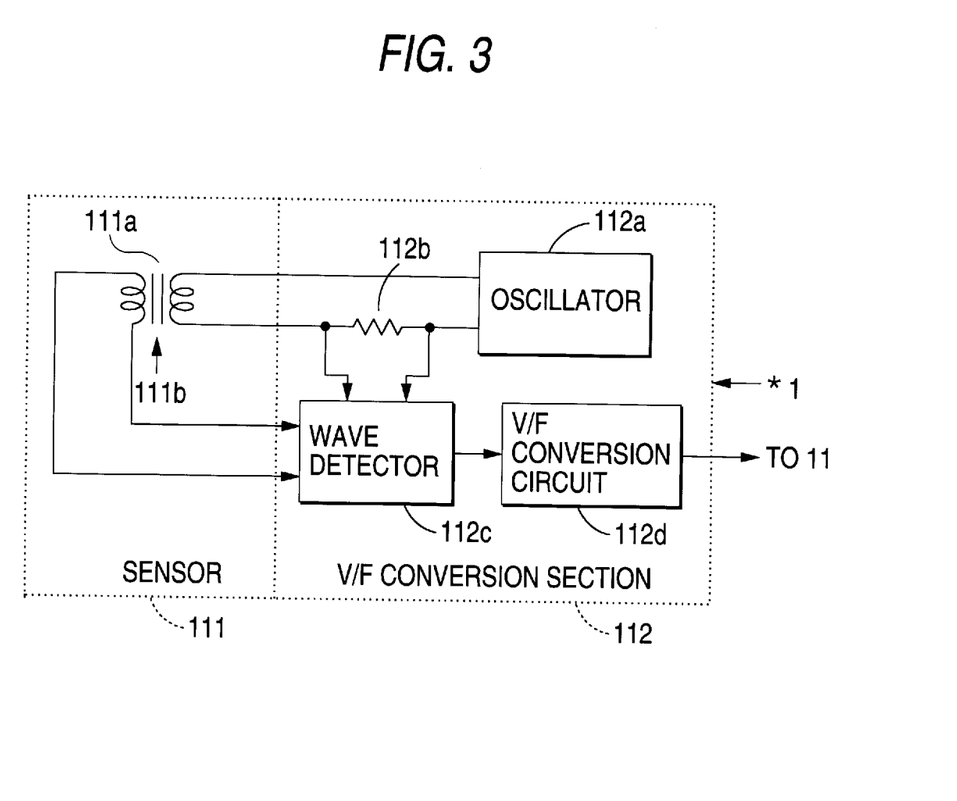
FIG. 3 is a block diagram showing an example of a weight sensor to be applied to the structure shown in FIG. 2 and illustrating a specific example of a sensor and a V/F conversion section.

As the weight sensor, a sensor having a structure shown in FIG. 3 is employed. The weight sensor has a sensor 111 and a V/F conversion section 112 and is structured to be operated with electric power supplied from a power supply circuit which will be described later. The sensor 111 has a magnetostrictor 111a and a transformer 111b, the magnetic path of which is the magnetostrictor 111a. The V/F conversion section 112 has an oscillator 112a, a resistor 112b, a wave detector 112c and a V/F conversion circuit 112d. When a load is applied to the magnetostrictor 111a, distortion is generated, thus causing the magnetic permeability to be changed. If the magnetic permeability is changed, voltage induced by a secondary coil of the transformer 111b is changed.

The voltage induced by the secondary coil is converted into a direct current (DC) by the wave detector so that the V/F conversion circuit 112d outputs a pulse signal having a frequency which is in proportion to the DC voltage. Note that the resistor 112b is a resistor having a large resistance value so as to be capable of maintaining an electric current which flows in a primary coil of the transformer 111b even if the output from the oscillator 112a is somewhat changed.

The wave detector 112c performs multiplication wave detection of the output signal from the secondary coil of the transformer 111b and a signal generated in the resistor 112b to reduce mixed noise components. The sensor 111 is provided for each of, for example, brackets for fixing the chassis and springs to which the weight of the vehicle is transmitted to the front wheels and the rear wheels. When a load is added to the sensor 111, the weight sensor causes the V/F conversion section 112 to output a pulse signal having a frequency corresponding to the added weight. The weight sensors include a type having the relationship between the weight and the frequency which is changed linearly and a type having the relationship between the same which is changed non-linearly in accordance with the characteristics of the weight sensor 111 and the V/F conversion section 112.

The μCOM 10 includes a central processing unit (CPU) 101 arranged to be operated in accordance with a program, a ROM 102 storing programs and stationary data, a RAM 103 having a data area for storing various data items and a work area which is used by the CPU 101 for performing a process, and a timer group 104 serving as a time measuring means for measuring various time periods. The CPU 101 performs a process arranged as shown in a flow chart which will be described later to serve as the weight calculating section 101a, the display control section 101b, the detection section 101c and the power supply control section 101d as described with reference to the basic structural view shown in FIG. 1.

A switch group 12 is connected to the μCOM 10, and a display unit 13 serving as a display means is connected to the same. The switch group 12 includes key switches serving as an input means for inputting various data items and detection switches for detecting various states. As one of the detection switches, a brake switch is provided. The display unit 13 is operated with electric power supplied from the power supply circuit which will be described later. Moreover, a nonvolatile memory (NVM) 14 storing data in such a manner that data cannot be lost even if electric power is not supplied, an ignition (IGN) switch 16 through an interface (I/F) circuit 15, and signal output terminals O and O1 to On through an interface (I/F) circuit 17 are connected to the μCOM 10 respectively.

The signal output terminal O outputs dead weight W obtained by adding the weight calculated in accordance with the load sensor signals supplied to the signal input terminals I1 to In. The signal output terminals O1 to On respectively output weights W1 to Wn calculated in accordance with the weight sensor signals supplied to the signal input terminals I1 to In. Reference numeral 18 designates a power supply circuit structured to supply electric power to the units including the μCOM 10 in the apparatus and is supplied with electric power from a battery 19 mounted on the vehicle. The power supply from the power supply circuit 18 to the weight sensors and the display unit 13 is controlled by the CPU 101 of the μCOM 10.

Note that the weight of the vehicle must be omitted in order to display the weight loaded on the vehicle on the display unit 13. Thus, the weight sensor 111 is mounted on the vehicle, and then the frequency output from the V/F conversion section 112 in a state where no cargo is loaded is measured so as to be recorded in a weight conversion coefficient recording portion of the nonvolatile memory 14. Weight values corresponding to the respective sensors and serving as references with which overload is determined and weight values serving as a reference with which overload of the overall weight loaded on the vehicle is determined are previously provided and stored in an overload weight recording portion of the nonvolatile memory 14. Data recorded in the nonvolatile memory 14 is retained even if the power supply is turned off.

The CPU 101 of the μCOM 10 performs a data setting process for recording data input from the switch group 12 in the weight conversion coefficient recording portion and the overload weight recording portion of the nonvolatile memory 14. The CPU 101 measures the frequencies of the pulse signals supplied from load sensors (not shown) through the I/F 11 and received by the input terminals I1 to In. That is, a calculation expressed by the following equation (1) is performed so that frequency H is calculated:

$$Hi = Ni \cdot /To \qquad (1)$$

wherein Hi is the frequency of the i-th sensor, To is a predetermined time (seconds) and Ni is the number of pulses of the i-th sensor which are output in To seconds.

If the frequency calculated in accordance with the foregoing equation (1) is not included in a predetermined range, occurrence of an error is displayed by the display unit 13. If a value, which is not realized usually, is measured attributable of mixture of noise or the like, occurrence of an error is displayed and the value is omitted.

The CPU 101 of the μCOM 10 determines whether or not a pulse signal has been, through the I/F 11, supplied from a running sensor mounted on the vehicle in a predetermined measuring period for a predetermined-time timer of the timer group 104 in the μCOM 10 so as to determine whether the vehicle is being driven or stopped.

The CPU 101 of the μCOM 10 reads a conversion coefficient and an offset frequency value from the weight conversion coefficient recording portion of the nonvolatile memory 14 to calculate the weight in accordance with the following equation (2):

$$Wi = Ki \, (H - H0) \qquad (2)$$

wherein Ki is the weight conversion coefficient of the i-th sensor, H0 is the offset frequency value of the i-th sensor and H is the frequency of the i-th sensor. The weights calculated in accordance with equation (2) and added to the respective weight sensors are added in accordance with the following equation (3) so as to calculate the dead weight W:

$$W = W1 + W2 +, \ldots, + Wn \qquad (3)$$

Weight Wi calculated in accordance with equation (2) and added to each weight sensor and dead weight W calculated in accordance with equation (3) are output through the I/F 17. Moreover, the dead weight W is displayed on the display unit 13. Data output through the I/F 17 is recorded on a connected recording apparatus if necessary so as to be used to administrate the state of operation of the vehicle.

The CPU 101 of the μCOM 10 determines whether or not the weight calculated in accordance with the equations (2) and (3) is the overload weight by making a reference to data recorded in the overload weight recording portion of the nonvolatile memory 14. If overload is determined, a buzzer (not shown) is operated and occurrence of the overload is displayed on the display unit 13. If the overload is determined, information of the overload of the weight loaded on each weight sensor and the dead weight is output through the I/F 17.

Figure 4:
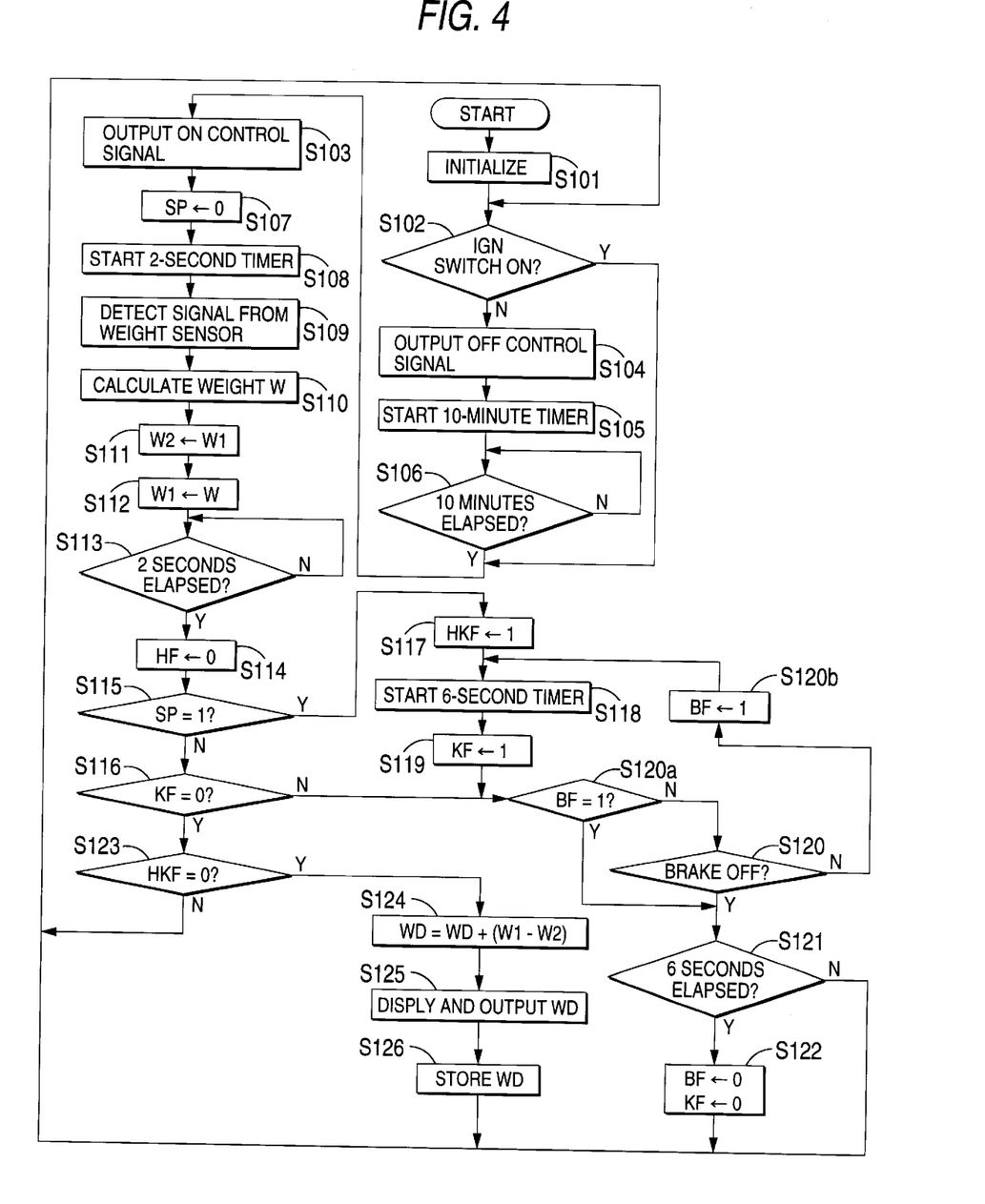
FIG. 4 is a flow chart showing an example of a main routine of the process which is performed by a CPU shown in FIG. 2.
Figure 5:
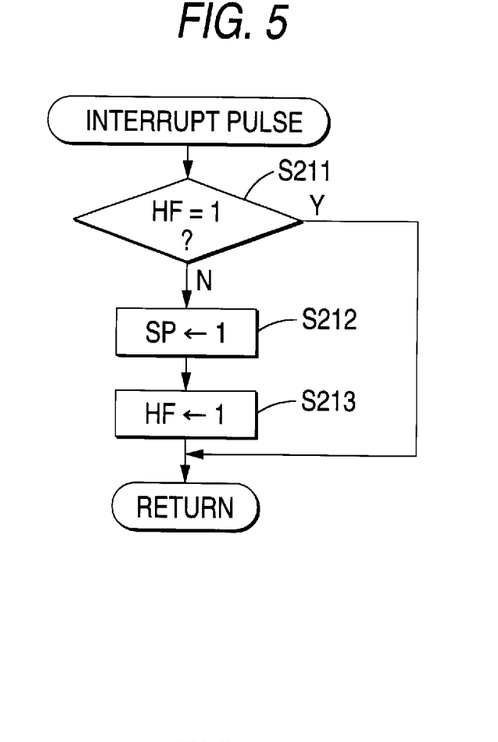
FIG. 5 is a flow chart showing an interruption process which is performed by the CPU in the μCOM shown in FIG. 2.
Figure 6:
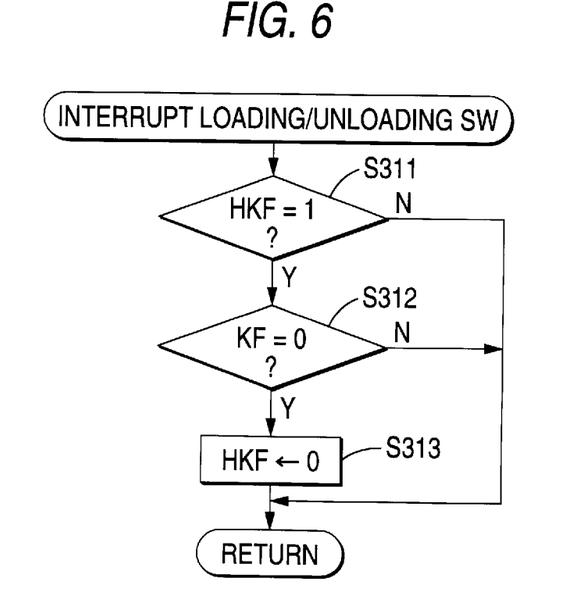
FIG. 6 is a flow chart showing another interruption process which is performed by the CPU in the μCOM shown in FIG. 2.
Figure 7:
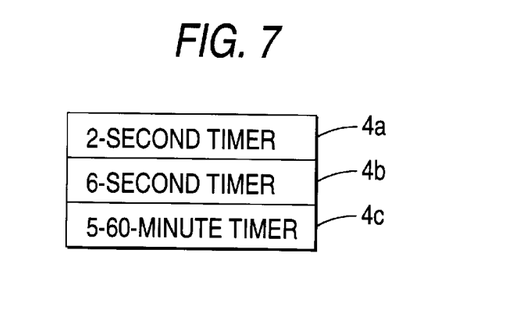
FIG. 7 is a diagram showing a timer in the form of a timer group in the μCOM shown in FIG. 2.

The operation of this embodiment will now be described with reference to flow charts shown in FIGS. 4 to 6 showing the processes which are performed by the CPU 101 of the μCOM 10. In this embodiment, the switch group 12 is provided with a loading/unloading switch composed of a momentary switch for generating a signal when depressed. The timer group 104 is, as shown in FIG. 7, composed of a two-second timer 4a, a six-second timer 4b and a 5–60-minute timer 4c. The flow chart of the main routine which is performed by the CPU 101 and shown in FIG. 4 is executed when the ignition (IGN) switch 16 of the vehicle having the apparatus mounted thereon is first switched on.

Figure 8:
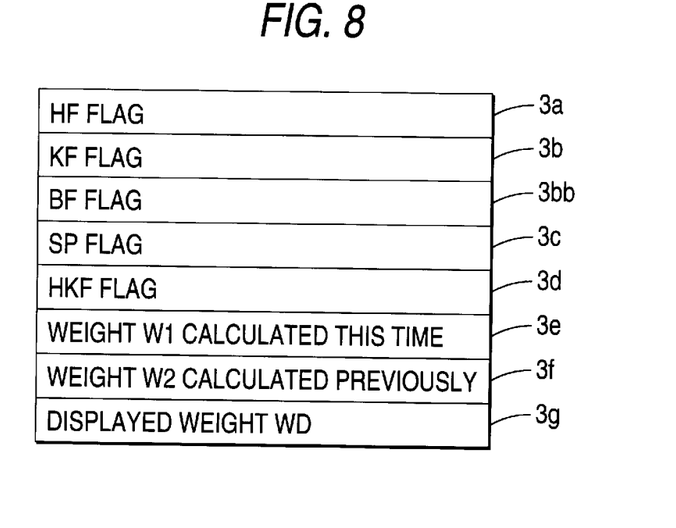
FIG. 8 is a diagram showing various areas formed in the work area in an RAM in the μCOM shown in FIG. 2 for use to execute the process in the flow charts shown in FIGS. 4 to 6.

In step S101 initialization is performed so that the contents of an HF flag area 3a, a KF flag area 3b, a BF flag area 3bb, an SP flag area 3c, an HKF flag area 3d, an area 3e for weight W1 calculated this time, an area 3f for previously calculated weight W2 and an area 3g for displayed weight WD formed in the work area in the RAM 103 and shown in FIG. 8 are reset. Moreover, initial display of the display unit 13 is set to be zero ton.

Note that the HF flag area 3a is made to be 0 whenever the two-second timer 4a included in the timer group 104 measures two seconds. If a pulse signal is supplied to the running-sensor signal input terminal I when the HF flag area 3a is 0, the HF flag area 3a is made to be 1. The KF flag area 3b is made to be 1 whenever the six-second timer 4b included in the timer group 104 starts to measure six seconds, while the same is made to be 0 when the six-second timer completes measurement of six seconds. The SP flag area 3c is made to be 0 immediately before the two-second timer 4a starts the measurement. If a pulse signal is supplied to the running-sensor signal input terminal I when the HF flag area 3a is 0, the SP flag area 3c is made to be 1.

When the CPU 101 of the μCOM 10 receives the pulse signal input to the running-sensor signal input terminal I through the interface (I/F) circuit 11, it executes a pulse interruption routine process shown in FIG. 5. When operation of the loading/unloading switch has been input, it executes a loading/unloading switch interruption routine process shown in FIG. 6.

The pulse interruption routine process which is started when a pulse signal has been supplied to the running-sensor signal input terminal I is performed such that whether or not the HF flag area 3a is 1, that is, whether or not a pulse signal has been supplied within two seconds or recently. If determination of this process is performed to be NO, the operation proceeds to step S212 so that the SP flag area 3c is made to be 1, and then the operation proceeds to step S213. In step S213 the HF flag area 3a is made to be 1, and then the operation returns to the main routine shown in FIG. 4. If the determination in step S211 is performed to be YES, that is, if a pulse signal has been supplied within two seconds or recently, the operation jumps over steps S212 and S213 and returns to the main routine.

In the loading/unloading switch interruption routine which is started when the loading/unloading switch has been switched on, whether or not the HKF flag area 3d is 1 in the first step S311 is determined. If the determination is performed to be YES, the operation proceeds to step S312. If the determination is performed to be NO, the operation returns to the main routine shown in FIG. 4. In step S312 whether or not the KF flag area 3b is 0 is determined. If the determination is performed to be YES, the operation proceeds to step S313. If the determination is performed to be NO, the operation returns to the main routine shown in FIG. 4. In step S313 the HKF flag area 3d is made to be 0, and then the operation returns to the main routine shown in FIG. 4. Thus, the operation of the loading/unloading switch causes the HKF flag area 3d to be 0.

In the next step S102, whether or not the ignition (IGN) switch 16 has been switched on is determined in accordance with a status signal of the IGN switch 16 supplied through the interface (I/F) circuit 15. If the IGN switch 16 has been switched on and thus the determination in step S102 is performed to be YES, an ON control signal is output to the power supply circuit 18 in the next step S103 so as to cause the power supply circuit 18 to supply electric power to the weight sensor through the I/F circuit 11 and also electric power to the display unit 13. If the determination in step S102 has been performed to be NO, that is, if the IGN switch 16 has been switched off, the operation proceeds to step S104 so that an OFF control signal is output to the power supply circuit 18 so as to cause the power supply circuit 18 to interrupt supply of electric power to the weight sensor and the display unit 13 through the I/F circuit 11.

After step S104 has been performed, the operation proceeds to step S105 so that the 5–60-minute timer 4c is caused to start the measurement of, for example, 10 minutes. In next step S106 completion of the measurement of, for example, 10 minutes from start of the measurement of the 5–60-minute timer 4c in step S105 is waited for. If, for example, 10 minutes has elapsed from the start of the measurement of the 5–60-minute timer 4c, the operation proceeds to step S103 so that the ON control signal is output to the power supply circuit 18 to cause the power supply circuit 18 to supply electric power to the weight sensor through the I/F circuit 11 and also to supply electric power to the display unit 13.

As a result of execution of steps S102 to S106, the CPU 101 serves as the power supply control section 101d for controlling the power supply circuit 18. The power supply control section 101d controls to interrupt supply of operating electric power from the power supply circuit 18 when the ignition switch 16 is switched off and has a 10-minute timer 4c for repeatedly measuring predetermined time intervals. Whenever the 10-minute timer 4c measures the predetermined time, the power supply circuit 18 is caused to supply operating electric power to at least the sensors and the CPU.

In the next step S107 the SP flag area 3c in the work area is made to be 0. In the next step S108 a time measuring operation of the two-second timer 4a which is a display updating timer is started. In the next step S109 weight sensor signals from the weight-sensor signal input terminals I1 to In supplied through the I/F circuit 11 are detected. As a result of the detection, the frequency is obtained in accordance with the number of pulses which are supplied in unit time T0 as expressed in equation (1).

In step S110 the dead weight W is calculated in accordance with the foregoing equations (2) and (3). In the next step S111 the consents of the area 3e for weight W1 calculated this time are stored in the area 3f for previously calculated weight W2. In the next step S112 the dead weight W calculated in step S110 is stored in the area 3e for weight W1 calculated this time. Then, the operation proceeds to step S113 so that whether or not the two-second timer 4a started in step S108 has measured two seconds is determined. Then, waiting for the determination to be YES is performed.

As a result of the above-mentioned steps S108 to S110, the CPU 101 acts as the weight calculating section 101a for calculating the weight at regular intervals in response to the output signal from the weight sensor 111 mounted on the vehicle.

When the two-second timer 4a started in step S108 has measured two seconds and thus the determination in step S113 has been made to be YES, the operation proceeds to step S114 so that the HF flag area 3a is made to be 0. Then, the operation proceeds to step S115. In step S115 whether or not the SP flag area 3c is 1 is determined. That is, whether or not a pulse signal has been supplied to the running-sensor signal input terminal I within two seconds or more recently is determined. If the determination in step S105 has been performed to be NO, that is, no pulse signal has been supplied to the running-sensor signal input terminal I within two seconds or more recently, the operation proceeds to step S116. If the determination has been performed to be YES, that is, if a pulse signal has been supplied to the running-sensor signal input terminal I within two seconds or more recently, the operation proceeds to step S117.

In step S117 the HKF flag area 3d is made to be 1, and then the operation proceeds to step S118 so that the six-second timer 4b starts measuring time. In next step S119 the KF flag area 3b is made to be 1, and then the operation proceeds to step S120a so that whether or not the BF flag area 3bb is 1 is determined. If the BF flag area 3bb is 0 and the determination in step S120a has been performed to be NO, the operation proceeds to step S120.

In step S120 whether or not the state of the brake switch input from the switch group 12 is OFF is determined. If the brake switch is switched off and the determination has been performed to be YES, that is, if the brake has been released, the operation proceeds to step S120b so that the BF flag area 3bb is made to be 1. Then, the operation proceeds to step S118 so that the six-second timer 4b restarts measurement of time.

If the brake switch is not switched off, that is, if the determination in step S120 has been performed to be NO, that is, if the brake has not been released, the operation proceeds to step S121. In step S121 whether or not the six-second timer 4b started in step S118 has measured six seconds is determined. If the determination in step S121 has been performed to be NO, the operation returns to step S102. If the determination has been performed to be YES, both of the KF flag area 3b and the BF flag area 3bb are made to be 0 in step S122. Then, the operation returns to step S102.

In step S116 whether or not the KF flag area 3b is 0, that is, whether or not the six-second timer 4b is measuring time is determined. If the determination in step S116 has been performed to be NO, that is, if the six-second timer 4b is measuring time, the operation proceeds to step S120. If the determination has been performed to be YES, that is, if the KF flag area 3b indicating an elapse of six seconds from stoppage of the vehicle is 0, the operation proceeds to step S123 so that whether or not the HKF flag area 3d is 0 is determined. If the HKF flag area 3d is 1 and the determination in step S123 is NO, that is, if the loading/unloading switch has not been operated though six seconds has elapsed from stoppage of the vehicle, the operation returns to step S102.

As described above, whether or not the brake switch is switched off, that is, whether or not the brake has been released is determined in step S120. If the brake has not been released and the predetermined time of six seconds has elapsed in the foregoing state, both of the KF flag area 3b and the BF flag area 3bb are made to be 0. If the brake has been released though the predetermined time of six seconds has not elapsed, both of the KF flag area 3b and the BF flag area 3bb are made to be 0 after another predetermined time of six seconds has elapsed from the above-mentioned moment. Therefore, influence of the change in the weight added to each weight sensor immediately after the brake has been released can be eliminated when the following process is performed.

If the HKF flag area 3d is 0 and thus the determination in step S123 is YES, that is, if six seconds has elapsed from stoppage of the vehicle and the loading/unloading switch has been switched on, the operation proceeds to step S124. In step S124 new weight WD to be displayed is calculated by adding the difference in the contents of the area 3e for weight W1 calculated this time and the area 3f for previously calculated weight W2 to the contents to the area 3g for displayed weight WD. The newly calculated weight WD is, in the next step S125, output to the display unit 13. In the next step S126 it is stored in the area 3g for displayed weight WD in place of the previous weight, and then the operation returns to step S102.

As a result of the execution of the loading/unloading interruption switch routine shown in FIG. 6 and that of step S123, the CPU 101 acts as the detection section 101c for detecting start of the loading/unloading operation. As a result of the execution of steps S124 and S125, the CPU 101 acts as the display control section 101b for performing control to cause the display unit 13 to display the calculated weight and to cause the display unit 13 to display a result of addition of the difference in the weights calculated sequentially to the weight which is being displayed.

Figure 9:
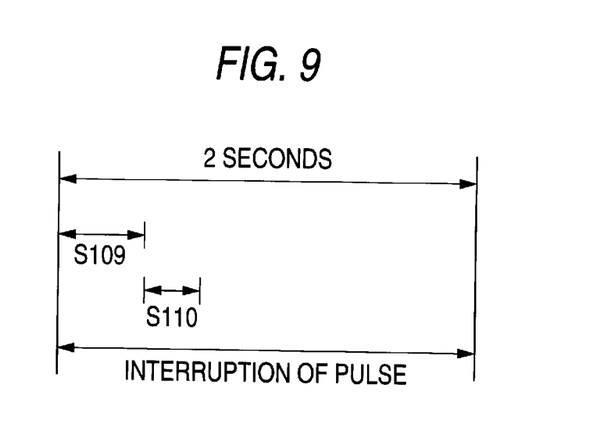
FIG. 9 is an explanatory view of a specific process which is performed in accordance with the flow chart shown in FIG. 4.

As a result of the execution of the foregoing flow chart, weight sensor signals supplied to the weight-sensor signal input terminals I1 to In in about first 0.5 second at intervals of two seconds are detected in step S109 as shown in FIG. 9. In accordance with the detected weight sensor signals, the dead weight W is calculated in the following step S110. If the pulse interruption routine shown in FIG. 5 is performed at an arbitrary moment during the two seconds, steps S116 and S120 to S126 are not performed after a lapse of two seconds. Therefore, display of the dead weight W calculated in step S110 is not performed on the display unit 13.

As a result of the process shown in FIG. 9, apparent enlargement of the dead weight can be deleted which is attributable to a sinking phenomenon of the rear portion of the bed of the vehicle occurring in a period from transmission of the power to actual running of the vehicle because of a state in which the wheels are not rotated at the initial stage of start of running of the vehicle and the weight is changed in a state where no running pulse is supplied, that is, the wheels do not rotate and thus the vehicle does not run until the power exceeds the initial load even if power is transmitted to the wheels attributable to the initial load.

Therefore, when a running pulse has been actually supplied from the running sensor, display of the dead weight W calculated within a predetermined previous time is not performed on the display unit 13. Thus, even if a state is realized in which the weight is changed in a state where the wheels are not rotated and thus no running pulse is supplied, display of the changed dead weight on the display unit can reliably be prevented.

The execution of steps S123 to S126 causes the difference in the weights calculated every two seconds to be obtained if a loading/unloading operation is performed after the loading/unloading switch has been operated so as to add the enlargement or reduction in the weight to the weight which is being displayed. Thus, even if the weight is changed during stopping attributable to a state of stopping, a true weight regardless of the change can continuously be displayed on the display unit 13.

If steps S123 to S126 are not performed and even if a determination is performed that the vehicle is stopped in a case where the running pulse is not supplied for time TW (=six seconds) or longer and the weight is calculated and the calculated weight is displayed, change in the calculated weight occurring due to the state of the road on which the vehicle is stopped cannot be prevented. Thus, there arises a problem in that the displayed weight, which is updated whenever stopping for time TW or longer is performed, becomes different from the weight calculated and displayed immediately after loading is performed. The execution of steps S123 to S126 is able to overcome the foregoing problem.

The operation in the flow charts shown in FIGS. 4 to 6 will now be described in which the loading/unloading switch is operated after a lapse of a predetermined time from stoppage of the vehicle, and then the ignition switch 16 is switched off without an actual loading/unloading operation, and then a loading/unloading operation is performed in a state where the ignition switch 16 is switched off.

When a predetermined time has elapsed from stoppage of the vehicle, no running pulse is supplied. As a result of step S107 performed at every two seconds, the SP flag area 3c is made to be 0. Step S122 causes both of the KF flag area 3b and the BF flag area 3bb to be 0. When the determination in step S115 is NO and the determination in the following step S116 is YES, the operation proceeds to step S123. When the loading/unloading switch is operated in the above-mentioned state, the loading/unloading switch interruption process shown in FIG. 6 is performed so that the HKF flag area 3d is made to be 0 in step S313. When the HKF flag area 3d has been made to be 0, the determination in step S123 is made to be YES so that steps S124 to S126 are performed. If no loading/unloading operation is performed in the above-mentioned state, display on the display unit 13 is not changed.

When the ignition switch 16 is switched off in a state where no loading/unloading operation is performed as described above, the determination in step S102 is made to be NO so that an OFF control signal is output to the power supply circuit 18 in step S104 to interrupt supply of electric power to the respective portions. Then, the operation proceeds to step S105 so that the 10-minute timer 4c is started and then the operation proceeds to step S106 so that an elapse of 10 minutes from the timer start is waited for. Note that the period of 10 minutes is the shortest time taken from switching the IGN switch 16 off to completion of the started loading/unloading operation. It may be made to be a longer time. When the determination in step S106 is made to be YES after an elapse of 10 minutes, the operation proceeds to step S103 so that an ON control signal is output to the power supply circuit 18 so that electric power is supplied to each portion. Then, steps S107 to S116 are performed, and then steps S123 to S126 are performed. Then, the operation returns to S102 so that the foregoing operation is repeated at intervals of 10 minutes. Since the foregoing repeated operation is performed such that electric power is supplied to each portion in a moment, electric power consumption can be minimized. Thus, complete consumption of the battery can be prevented.

If weights calculated sequentially become different attributable to the loading/unloading operation during the above-mentioned repeated operation, the difference is added to the weight which is being displayed so as to update the displayed weight WD. Since no electric power is supplied to the display unit 13 at this time, display is retained to be turned off. When the ignition switch 16 is switched on, an accurate dead weight enlarged or reduced attributable to the loading/unloading operation can be displayed on the display unit 13.

The foregoing operation is performed in the case where the loading/unloading switch has been switched on and thus the fixed display of the weight has been suspended when the ignition switch 16 is switched off. If the loading/unloading switch has not been switched on when the ignition switch 16 is switched off, the HKF flag area 3d does not have opportunity in which it is made to be 0. In this case, the dead weight which is enlarged or reduced attributable to the loading/unloading operation cannot be displayed on the display unit 13 in a state where the ignition switch 16 is retained to be switched off.

In the above-mentioned embodiment described with reference to the flow charts shown in FIGS. 4 to 6, the loading/unloading switch must be operated prior to performing the loading/unloading operation. If it is not operated, the weight loaded or unloaded from stoppage of the vehicle to the operation of the loading/unloading switch is not added to the displayed weight. Thus, enlargement or reduction in the weight cannot be detected at an intermediate moment, thus causing a state to arise in that the real dead weight cannot be detected. In this case, the weight display unit does not serve as a required weight display unit. In this case, there arises a problem in that all of the cargoes must be unloaded and then reloaded to calculate the actual dead weight.

Another embodiment structured to be capable of solving the above-mentioned problem will now be described with reference to FIGS. 10 and 11.

The hardware structure of this embodiment may be the same as that of the dead weight display apparatus shown in FIG. 2 except for a switch group 12 which is not required to be provided with the loading/unloading switch. Since the loading/unloading switch is excluded, the loading/unloading switch interruption routine shown in FIG. 6 is omitted. Note that the RAM 103 included in the CPU 101 has, as shown in FIG. 11, an area 3h for reference weight WS and an area 3i for deviation $\Delta W$ formed in addition to the areas 3a to 3g shown in FIG. 8.

Figure 10:
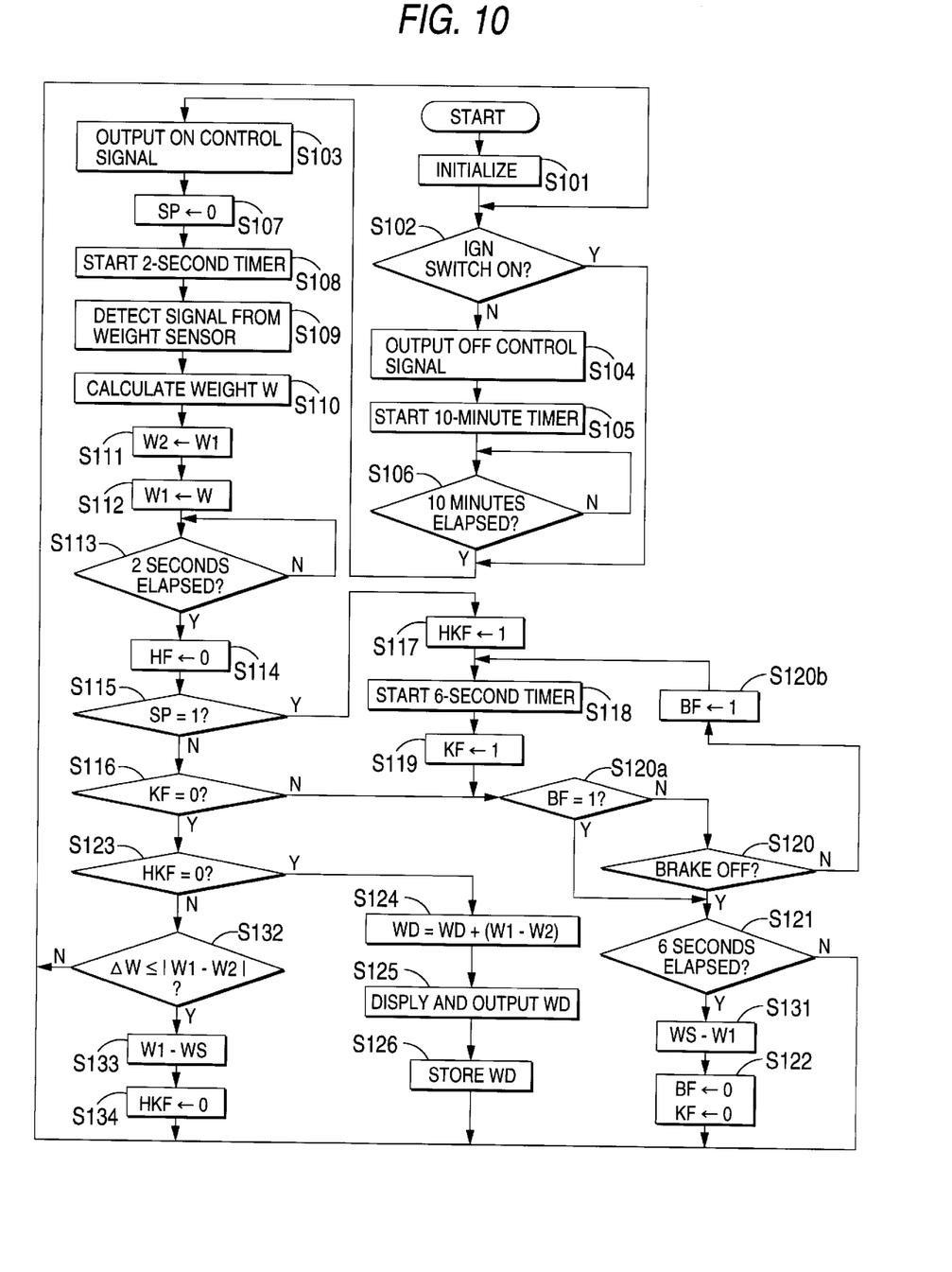
FIG. 10 is a flow chart showing another example of the main routine of the process which is performed by the CPU in the μCOM shown in FIG. 2.
Figure 11:
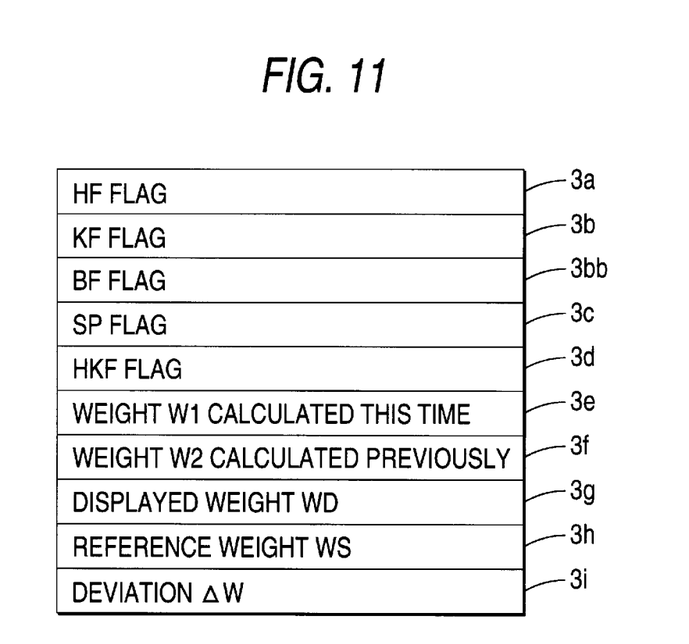
FIG. 11 is a diagram showing various areas formed in the work area in the RAM in the μCOM shown in FIG. 2 for use to execute the process in the flow chart shown in FIG. 10.

In an initial process set in the first step S101 in the flow chart shown in FIG. 10, the area 3h for reference weight WS is reset and a predetermined value, for example, 0.1 ton to 1 ton, is set to the area 3i for deviation $\Delta W$. Steps S102 to S126 are the same as those shown in FIG. 4. However, if the determination in step S121 is performed to be YES, the operation proceeds to step S131 so that weight W1 calculated in step S110 and stored in the area 3e for weight W1 calculated this time in step S112 is stored in the area 3h for reference weight WS. As a result, the weight W calculated immediately before a lapse of six seconds from stopping is used in the following process as the reference weight WS for the stoppage state.

When the determination in step S116 has been performed to be YES, that is, when six seconds have elapsed, the operation proceeds to step S123 so that whether or not the HKF flag area 3d is 0 is determined. Since the HKF flag area 3d is retained to be 1 in step S117, the determination in step S123 is performed to be NO. Then, the operation proceeds to step S132. In step S132, whether or not the absolute value of the difference between the contents of the area 3e for weight W1 calculated this time and those (=WS) of the area 3h for reference weight WS is equal to the contents of the area 3i for deviation $\Delta W$ or more, that is, whether or not $\Delta W \leq |W1-W2|$ is satisfied is determined. This determination is performed in order to judge whether or not a loading/unloading operation has been started in accordance with whether or not the weight in the stoppage state has been enlarged or reduced by $\Delta W$ or more. If the determination has been performed to be NO, the operation returns to step S102. If the determination has been performed to be YES, the operation proceeds to step S133 so that the contents of the area 3h for reference weight WS are stored in the area 3h for reference weight WS. Then, in the next step S134 the HKF flag area 3d is made to be 0, and then the operation returns to step S102.

As described above, the HKF flag area 3d is made to be 0 in step S134 so that the determination in step S123 is performed to be YES in a state where the vehicle is stopped. Thus, steps S124 to S126 are performed. As a result, the weights enlarged or reduced attributable to the loading/unloading operation in the stoppage state are sequentially added or subtracted with respect to the weight which is being displayed so that the display is updated.

The operation in the flow chart shown in FIGS. 10 and 11 will now be described which is performed when the ignition switch 16 is switched off in a state where no actual loading/unloading operation is performed after a predetermined time has elapsed from stoppage of the vehicle, and then the loading/unloading operation is performed in a state where the ignition switch 16 is retained to be switched off.

If a predetermined time has elapsed after the vehicle has been stopped, no running pulse is supplied. As a result of step S107 which is performed at every two seconds, the SP flag area 3c is made to be 0. In step S122 both of the KF flag area 3b and the BF flag area 3bb are made to be 0. The determination in step S115 is performed to be NO, and then the determination in step S116 is performed to be YES so that the operation proceeds to step S123. Since the HKF flag area 3d is retained to be 1 in step S117, the determination in step S123 is performed to be NO so that the operation proceeds to step S132. In step S132 whether or not a loading/unloading operation has been started is determined in accordance with whether or not the weight in the stoppage state has been enlarged or reduced by $\Delta W$ or more. If the determination has been performed to be NO, the operation returns to step S102 so that the steps following step S102 are performed.

If the ignition switch 16 is switched off during the above-mentioned process without performing a loading/unloading, the determination in step S102 is made to be NO so that the OFF control signal is output to the power supply circuit 18 in step S104 to interrupt supply of electric power to each portion. Then, the operation proceeds to step S105 so that the 10-minute time 4c is started. Then, the operation proceeds to step S106 so that an elapse of 10 minutes from start of the timer is waited for. When 10 minutes have elapsed and the determination in step S106 has been performed to be YES, the operation proceeds to step S103 so that the ON control signal is output to the power supply circuit 18 to supply electric power to each portion.

If a loading/unloading operation is performed during the above-mentioned repeated operation, the weight in the stoppage state is enlarged or reduced by $\Delta W$ or more. Thus, the determination in step S132 is performed to be YES so that the operation proceeds to step S134 so that the HKF flag area 3d is made to be 0. Therefore, the determination in step S123 is performed to be YES afterwards so that the operation proceeds to steps S107 to S116. Then, steps S123 to S126 are performed, and then the operation returns to step S102. If the weights sequentially calculated during the above-mentioned process become different, the difference is added to the weight which is being displayed to update the displayed weight WD. The above-mentioned operation is repeated at intervals of 10 minutes. Since electric power is supplied to each portion in a moment, electric power consumption can be minimized to prevent complete consumption of the battery. Since electric power is not supplied to the display unit 13 at this time, display is retained to be turned off. When the ignition switch 16 is switched on, an accurate dead weight enlarged or reduced attributable to the loading/unloading operation can be displayed on the display unit 13.

As described above, when six seconds or longer have elapsed from stopping, enlargement or reduction in the weight by the predetermined weight $\Delta W$ or more from the weight in the stoppage state which is the reference weight is detected. In accordance with a result of the detection, performing of a loading/unloading operation is determined. The enlarged or reduced weights are sequentially added or subtracted with respect to the weight which is being displayed so as to automatically update the displayed weight. As a result, the manual operation means, such as the loading/unloading switch is not required. Thus, a problem in that the weight after loading or unloading cannot be detected which arises attributable to neglect of the operation can be prevented.

Figure 12:
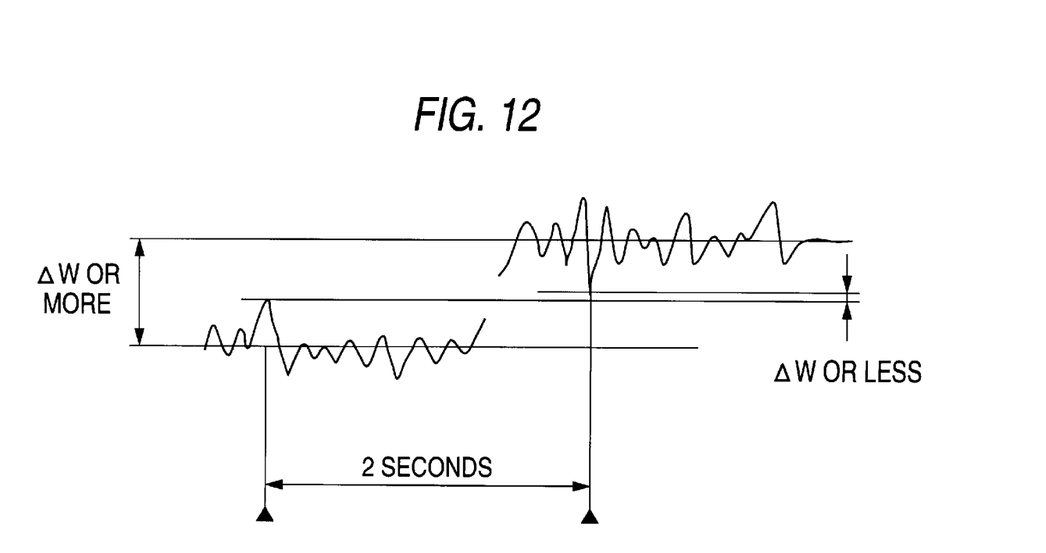
FIG. 12 is a diagram showing a problem which must be overcome when the process in the flow chart shown in FIG. 10 is performed.

If six seconds have elapsed from stopping, the operation proceeds to step S132 so that whether or not the absolute value of the difference between the contents of the area 3e for weight W1 calculated this time and those of the area 3h for reference weight WS is equal to the contents of the area 3i for deviation $\Delta W$ or more, that is, whether or not $\Delta W \leq |W1-W2|$ is satisfied is determined. This determination is performed in order to judge whether or not a loading/unloading operation has been started in accordance with whether or not the weight in the stoppage state has been enlarged or reduced by $\Delta W$ or more. However, outputs from sensors have noise, such as vibrations and the like superimposed thereon, as shown in FIG. 12. Therefore, the levels of the output signals received sequentially at the interval of two seconds scatter. If the levels of the output signals are the maximum value and the minimum value as shown in FIG. 12, the difference which must be $\Delta W$ or more, is made to be $\Delta W$ or less. Therefore, the determination in step S132 cannot accurately be performed.

Figure 13:
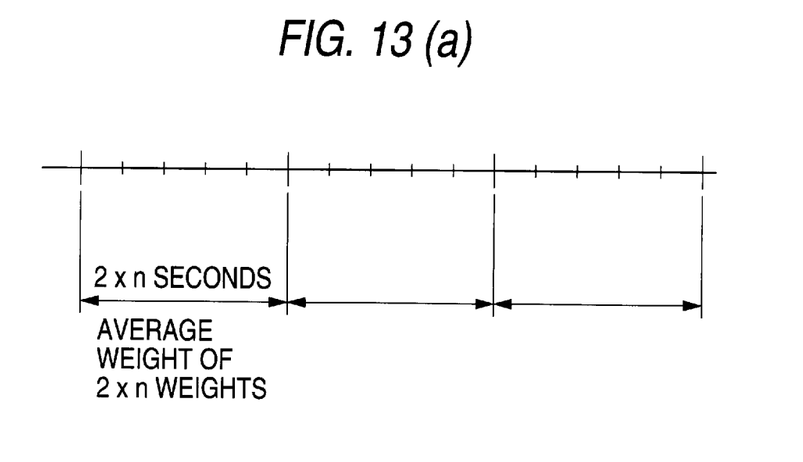
FIGS. 13(a) and 13(b) are diagrams showing methods for overcoming the problem shown in FIG. 12.

To overcome the foregoing problem, n (=5) weights detected at intervals of two seconds are averaged to obtain a mean weight at intervals of 2×n seconds as shown in FIG. 13 (a) or a latest weight obtainable at intervals of two seconds is substituted for the most previous weight to moving-average n weights so as to obtain a mean weight at intervals of two seconds as shown in FIG. 13(b).

The pulse interruption routine process shown in FIG. 5 is performed when the running pulse signal generated from the running sensor during running of the vehicle is received through the running-sensor signal input terminal I. When one running pulse is supplied, a determination is performed that the vehicle is running. Since a running sensor of a vehicle sometimes one pulse attributable to rattling generated due to rotations even if the vehicle is stopped, a plurality of running pulses may be supplied to prevent an error in the operation so as to determine that the vehicle is being running.

As described above, the weight calculating section 101a calculates the weight in accordance with the signal output from the weight sensor 111, and the display control section 101b causes the weight calculated by the weight calculating section 101a during stoppage to be displayed on the display unit 13. If a determination has been performed that the vehicle is running in accordance with existence of the running pulse signal supplied from the running sensor mounted on the vehicle, the weight calculated before running by a predetermined time is displayed on the display unit 13.

Since the weight calculated before running is, as described above, displayed when the vehicle is running, accurate dead weight can be displayed even if the dynamic load which is added to the sensor attributable to running of the vehicle is changed. If the vehicle is determined to be running, the process for calculating the weight from the sensor is interrupted. In this case, the weight calculated before stoppage, that is, the weight calculated before running by a predetermined time is displayed. Therefore, the load for the processor which performs the predetermined process can be reduced.

The display control section 101b causes the display unit 13 to display the weight before running for a predetermined time even if the running vehicle has been stopped. Therefore, if the running vehicle is brought to the stoppage state, the weight before running is displayed for a predetermined period. Therefore, the load affected by the vibration of the vehicle which is in the transition state from running to stopping is not displayed. Thus, accurate dead weight can be displayed.

The detection section 101c detects start of a loading/unloading operation after a predetermined time has elapsed from a moment at which the running vehicle has been stopped. The display control section 101b causes the display unit 13 to display the weight obtained by adding, to the weight which is being displayed, the difference between the weights sequentially calculated by the weight calculating section 101a in a period from detection of the start of the loading/unloading operation by the detection section 101c to start of running of the vehicle. After a predetermined time has elapsed from a moment at which the running vehicle has been stopped, start of a loading/unloading operation is detected. The difference between weights sequentially calculated from detection of the start of the loading/unloading operation to start of running of the vehicle is added to the weight which is being displayed so that the obtained weight is displayed. Therefore, the weight enlarged or reduced attributable to the loading/unloading operation is displayed. Even if the place on which the vehicle is stopped during the operation is inclined, accurate weight can be displayed.

The weight calculating section 101a calculates the weight in accordance with the output signal from the sensor in the first period of the predetermined time. The display control section 101b determines that the vehicle is running in accordance with the running pulse signal output from the running sensor within the predetermined time. In accordance with the output signal from the sensor, weight is calculated in the first period of the predetermined time. If the vehicle is running within the foregoing predetermined time, the weight calculated before running of the vehicle is displayed. Therefore, even if the load which is added to the sensor before running of the vehicle is changed, accurate dead weight can be displayed.

Since the detection section 101c detects the operation of the switch which is manually operated when a loading/unloading operation is started to detect start of the loading/unloading operation, weight which is enlarged or reduced by a small quantity attributable to the loading/unloading operation can reliably be displayed.

The detection section 101c detects a fact that the difference between the weight calculated after a predetermined time has elapsed from the moment at which the running vehicle has been stopped and the weight calculated afterwards has become a predetermined value or more to detect start of the loading/unloading operation. Therefore, the display is changed only when the dead weight has been changed attributable to the loading/unloading operation. Thus, accurate dead weight can be displayed so that any manual operation is not required when the operation is started. Therefore, the fact that the weight cannot be detected because of neglecting of the operation can reliably be prevented.

As described above, according to the invention, weights calculated at predetermined intervals in accordance with the output signals from the sensors mounted on the vehicle are displayed. Moreover, the difference between weights calculated sequentially from detection of start of a loading/unloading operation to start of running of the vehicle is added to the weight which is being displayed so as to be displayed. If the ignition switch is switched off, the operating electric power is supplied only at predetermined intervals. Thus, the electric power consumption can be minimized. Even if the ignition switch is switched off, the difference in the weights calculated sequentially is used to detect the weight enlarged or reduced attributable to the loading/unloading operation. When the ignition switch is switched on, display of weight can be performed in which the weight enlarged or reduced attributable to the loading/unloading operation is reflected to the weight which is being displayed. Moreover, an overload state can be determined and an alarm can be issued.

What is claimed is:

1. A dead weight display apparatus comprising:

weight calculating means for calculating a weight at regular intervals in response to an output signal from a sensor attached to a vehicle;

display means for displaying the weight;

display control means for controlling said display means to display the weight calculated by said weight calculating means;

detection means for detecting start of a loading/unloading operation;

a power supply circuit for supplying operating electric power to said sensor, said display means, said display control means and said detection means; and power supply control means for controlling said power supply circuit, wherein said display control means adds difference between the weights sequentially calculated by said weight calculating means from detection of start of the loading/unloading operation performed by said detection means to start of running of the vehicle to the weight which is being displayed and causes said display means to display the added weight, and said power supply control means has time measuring means for repeatedly measuring time at regular intervals in a period in which an ignition switch is switched off and causes said power supply circuit to supply the operating electric power to at least said sensor, said display control means and said detection means whenever said time measuring means measures time at the regular intervals.

2. The dead weight display apparatus according to claim 1, wherein said display control means, during running of the vehicle, causes said display means to display a weight detected before start of running by a predetermined time and controls the display to be retained for a predetermined time even after the running vehicle has been brought to a stoppage state.

3. The dead weight display apparatus according to claim 1, wherein said detection means detects start of the loading/unloading operation after a predetermined time has passed from a moment at which the running vehicle has been brought to a stoppage state.

4. The dead weight display apparatus according to claim 3, wherein said detection means detects start of the loading/unloading operation when said detection means has detected a fact that a difference between the weight calculated after the predetermined time has passed from the moment at which the running vehicle has been brought to the stoppage state and the weight calculated afterwards has exceeded a predetermined value.

5. The dead weight display apparatus according to claim 1, wherein said weight calculating means calculates the weight by average-processing a plurality of output signals obtained from sensors at the regular intervals.

* * * * *